United States Patent [19]

Hynes

[11] 4,242,110
[45] Dec. 30, 1980

[54] COMPRESSED GAS DRYING APPARATUS

[75] Inventor: William M. Hynes, Mountain Home, Ark.

[73] Assignee: Miller Fluid Power Corporation, Bensenville, Ill.

[21] Appl. No.: 61,652

[22] Filed: Jul. 26, 1979

[51] Int. Cl.³ .............................................. B01D 50/00
[52] U.S. Cl. ................................ 55/269; 55/DIG. 17; 62/90; 62/93
[58] Field of Search ............. 55/269, DIG. 17; 62/90, 62/93; 165/66, 111, 113, 143

[56] References Cited

U.S. PATENT DOCUMENTS

| | | | |
|---|---|---|---|
| 2,783,623 | 3/1957 | Dodge | 62/90 |
| 3,453,809 | 7/1969 | Henderson | 165/111 |
| 3,797,565 | 3/1974 | Fernandes | 62/93 |
| 3,963,466 | 6/1976 | Hynes | 55/269 |
| 4,027,729 | 6/1977 | Brühl | 62/90 |

Primary Examiner—David L. Lacey
Attorney, Agent, or Firm—Wegner, Stellman, McCord, Wiles & Wood

[57] ABSTRACT

This invention relates to apparatus for drying gases, more particularly compressed air. In the gas drying apparatus there is presented a single vessel partitioned into various flow passages so as to direct the incoming water vapor bearing compressed gases through a heat exchanger, a refrigeration section, a demister, and then through a second heat exchanger for exit from the apparatus. The arrangement of parts is such as to permit all of these functions in a very small vessel.

2 Claims, 2 Drawing Figures

COMPRESSED GAS DRYING APPARATUS

BACKGROUND OF THE INVENTION

In my prior U.S. Pat. No. 3,963,466, there was provided a unitary vessel for removing water vapor from gases and particularly for removing water vapor from compressed air. Prior to my previous invention, the functions of cooling, drying, and warming were normally performed in separate distinct vessels requiring substantial ducting and utilizing considerable space. In accordance with the invention of my aforesaid patent, all of those functions were condensed into a unitary vessel with resultant savings in space, energy, and cost. The apparatus shown in said earlier patent, however, found its most efficient application in situations where relatively large quantities of compressed air were being dealt with, with the unit considered to be somewhat less efficient on a cost basis in situations where a relatively small quantity of compressed air was to be dried. It is one of the purposes of the present invention to overcome the situation just mentioned.

SUMMARY OF THE INVENTION

In the present invention there is provided a vertical cylindrical vessel which, by the utilization of concentric cylindrical walls within the vessel, divides the same into vertical passages. Heat exchangers, refrigerant walls, and demisters are provided in thermal relationship with the various passages to define a compact yet highly efficient dryer of compressed gases which can remove water vapor efficiently from small quantities of compressed air with an apparatus which is efficient yet inexpensive, as well as being relatively small.

DESCRIPTION OF THE PREFERRED EMBODIMENT

Figure 1:
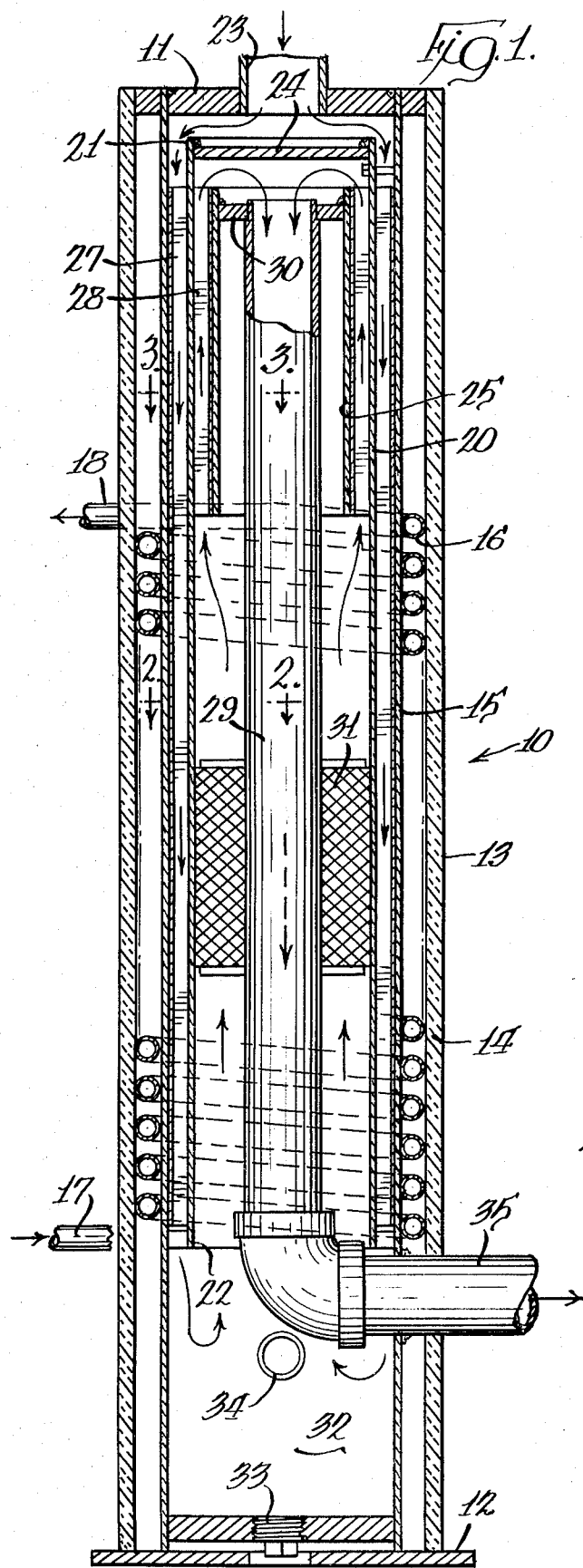
FIG. 1 is a vertical section of an apparatus embodying the present invention.
Figure 2:
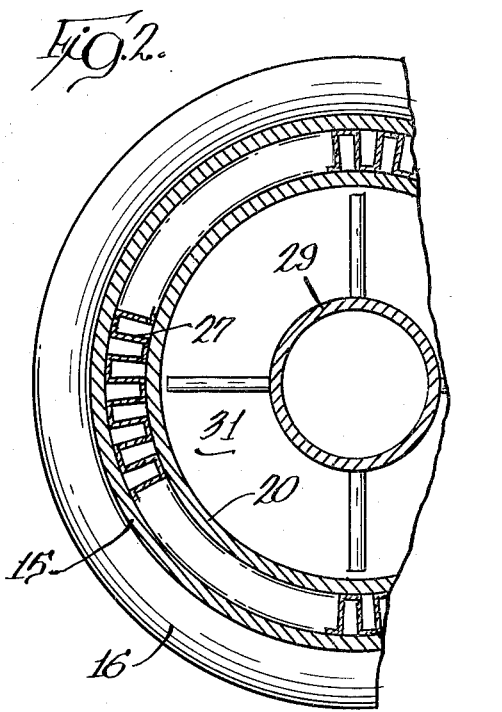
FIG. 2 is a horizontal section along line 2—2 of FIG. 1.
Figure 3:
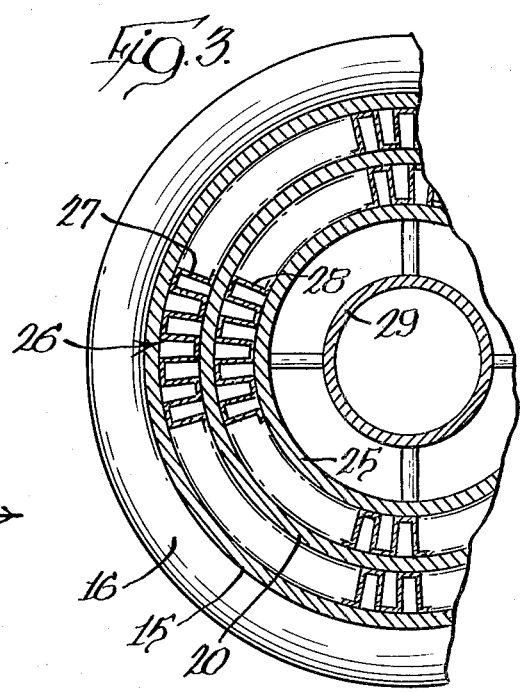
FIG. 3 is a horizontal section along line 3—3 of FIG. 1.

Referring now to the drawings, there is shown a vertically arranged vessel 10 having a top 11 and a bottom 12. The exterior of the vessel is defined by a casing 13 extending from the top to the bottom with the casing preferably being insulated as shown at 14. If desired, the exterior casing may consist solely of a thick sealed cell neoprene insulating material and the exterior shell 13 may be omitted. Spaced inwardly from the exterior casing is an interior casing 15 which also extends from the top to the bottom of the vessel. Refrigeration coils 16 are located in the space between the exterior casing and the interior casing with the coils being provided with an inlet 17 and an outlet 18 leading to a suitable compressor-evaporator refrigeration system.

Spaced interiorly of the interior casing 15 is a first cylindrical wall 20. The wall 20 is concentric with the inner casing and hence with the vessel 10, with its upper end 21 spaced downwardly from the top 11 of the vessel and with its lower end 22 spaced upwardly from the bottom of the vessel. Extending through a suitable opening in the top 11 is an inlet 23 which opens into the interior of the vessel above the upper end of the first cylindrical wall 20. A flat plate 24 forms a closure closing off the upper end of the first cylindrical wall 20 and serves to deflect compressed air entering the inlet 23 into the space between the inner surface of the inner casing and the outer surface of the first cylindrical wall.

Spaced inwardly from and concentric with the first cylindrical wall 20 is a second cylindrical wall 25. As can be seen from the drawings, the second cylindrical wall is relatively short, having an overall length about one-fourth of the overall length of the vessel 10. The upper end of the second cylindrical wall 25 is near but spaced downwardly from the plate 24.

A multi-surface heat exchanger 26 is located in the upper part of the vessel with the heat exchanger having a first portion 27 in the space between the inner casing and the first cylindrical wall, and a second portion 28 in the space between the first and second cylindrical walls. The heat exchanger is preferably made of what is known as fin stock and is, as shown, located on opposite sides of the first wall 20.

Extending vertically through the central portion of the vessel is a discharge pipe 29 having its upper end near the top of the second cylindrical wall. A plate 30 seals the exterior surface of the pipe to the interior surface of the second wall. The pipe 29 extends downwardly to a point below the lower end of the first wall 20.

At the bottom portion of the vessel 10 there is a space forming a sump 32. A drain plug 33 is provided for periodic cleaning of the sump, while a water outlet 34 is provided in the side of the sump to drain water therefrom from time to time as it accumulates. The pipe 29 exits from the vessel through a vessel outlet connection 35 from which the cooled dry gases flow.

In operation, compressed air containing water vapor enters the inlet 23, is deflected by the plate 24 to direct the air into the passage defined by the space between the inner casing and the first cylindrical wall. In traveling downwardly through that space the air passes through the first portion 27 of the heat exchanger 26. Thereafter, the air passes downwardly through the portion chilled by the refrigerant coils 16 to cause vapor carried by the gas to condense on the facing walls of the interior casing and the first cylindrical wall. Moisture may drip into the sump 32.

Exiting from the bottom end of the passage just described, the compressed air reverses its course as shown by the arrow and is directed to move upwardly through the demister 31 where the entrained droplets are removed. The relatively cool dry compressed air continues its movement upwardly into the passage defined by the interior surface of the first wall and the exterior surface of the second wall wherein is located the second portion 28 of the heat exchanger. Cool air entering the second portion of the heat exchanger is warmed by the incoming hot air in the first portion of the heat exchanger. Warmed air then passes over the top of the cylindrical wall 25 downwardly into the pipe 29 and thence outwardly through the discharge outlet 35.

I claim:

1. A compressed air drying apparatus comprising a vertically arranged cylindrical vessel having a top and a bottom, an exterior casing forming the outer cylindrical surface of the vessel, an interior cylindrical casing spaced inwardly from the outer casing with both of said casings extending from top to bottom of the vessel, refrigeration coils in the space between the casings and in heat transfer relationship with the outer surface of the inner casing, a first cylindrical wall interiorly spaced from the inner casing and concentric therewith with the upper end of said first wall being spaced downwardly from the top of the vessel and with the lower end of said first wall being spaced upwardly from the bottom of said vessel, an inlet at the top of said vessel and opening into the interior thereof above the upper end of the first wall, a closure over the upper end of the first wall to deflect air entering through the inlet into the space between the inner casing and the first wall, a second cylindrical wall mounted within and spaced from the first cylindrical wall, said second wall being relatively short and having its upper end near but spaced downwardly from said closure, a multi-surface heat exchanger in the vessel having a first portion in the space between the inner casing and the first cylindrical wall and a second portion in the space between the first cylindrical wall and the second cylindrical wall, a discharge pipe within but spaced from the second cylindrical wall and having its upper open end near the top of the second cylindrical wall, the exterior surface of said pipe being sealed to the interior of the second wall, said pipe extending downwardly through the vessel to a point below the lower end of said first wall, a demister in the vessel below the lower end of the second wall and mounted to fill the space between the exterior surface of the pipe and the interior surface of the first wall, a sump at the bottom of the vessel and means connected to the lower portion of the pipe for conducting dried air outwardly of the vessel whereby compressed air entering the vessel through the inlet is deflected by said closure for passage downwardly in the space between the inner casing and the first wall and through the first portion of the heat exchanger to the lower end of said first wall thence upwardly in the space between the pipe and the first wall through the demister into the space between the first and second walls where it passes through the second portion of the heat exchanger and thereafter downwardly through said pipe to the exterior of the vessel.

2. A compressed air drying apparatus comprising a vertically arranged vessel having a top and a bottom, an exterior casing forming the outer surface of the vessel, an interior cylindrical casing spaced inwardly from the outer casing, refrigeration means in the space between the casings and in heat transfer relationship with the outer surface of the inner casing, a first cylindrical wall interiorly spaced from the inner casing and concentric therewith with the upper end of said first wall being spaced downwardly from the top of the vessel and with the lower end of said first wall being spaced upwardly from the bottom of said vessel, an inlet at the top of said vessel and opening into the interior thereof above the upper end of the first wall, means adjacent the upper end of the first wall to deflect air entering through the inlet into the space between the inner casing and the first wall, a second cylindrical wall mounted within and spaced from the first cylindrical wall, said second wall being relatively short and having its upper end near but spaced downwardly from said deflecting means, a heat exchanger in the vessel having a first portion in the space between the inner casing and the first cylindrical wall and a second portion in the space between the first cylindrical wall and the second cylindrical wall, a discharge pipe within but spaced from the second cylindrical wall and having its upper open end near the top of the second cylindrical wall, means forming an airtight connection between the exterior surface of said pipe and the interior surface of the second wall, said pipe extending downwardly through the vessel to a point below the lower end of said first wall, a demister in the vessel mounted to fill the space between the exterior surface of the pipe and the interior surface of the first wall, a sump at the bottom of the vessel and means connected to the lower portion of the pipe for conducting dried air outwardly of the vessel, whereby compressed air entering the vessel through the inlet is deflected by said deflecting means for passage downwardly in the space between the inner casing and the first wall and through the first portion of the heat exchanger to the lower end of said first wall thence upwardly in the space between the pipe and the first wall through the demister into the space between the first and second walls where it passes through the second portion of the heat exchanger and thereafter downwardly through said pipe to the exterior of the vessel.

* * * * *